J. W. SHEPERDSON.
CONVEYING MECHANISM.
APPLICATION FILED AUG. 18, 1917.
1,352,766. Patented Sept. 14, 1920.
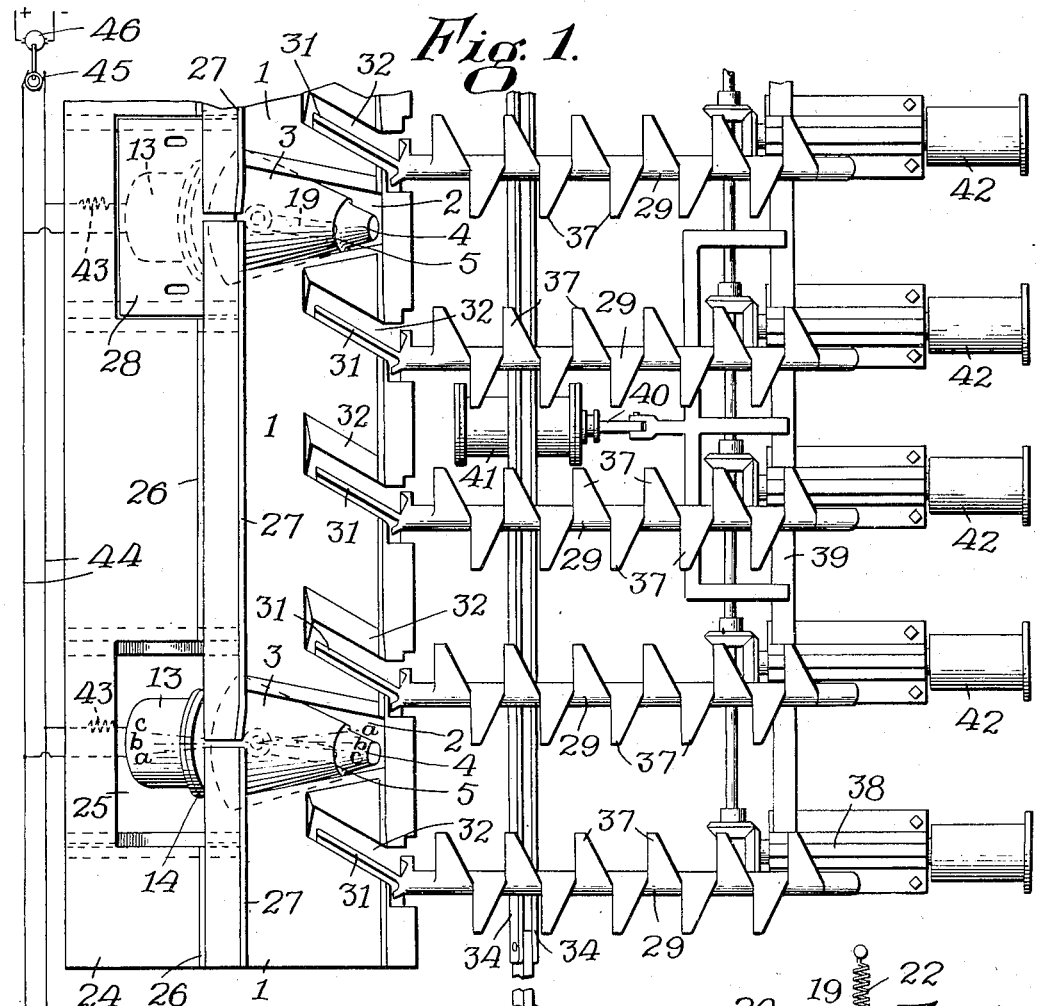
Fig. 1.
Fig. 3.
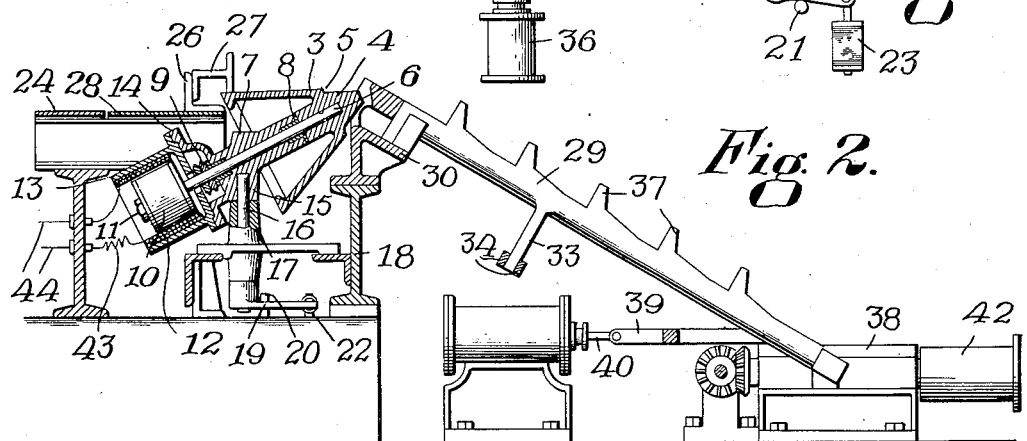
Fig. 2.
Inventor
John W. Sheperdson
By Attorneys Fowler & Kennedy

UNITED STATES PATENT OFFICE.

JOHN W. SHEPERDSON, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CONVEYING MECHANISM.

1,352,766.     Specification of Letters Patent.      Patented Sept. 14, 1920.

Application filed August 18, 1917. Serial No. 186,874.

*To all whom it may concern:*

Be it known that I, JOHN W. SHEPERDSON, a subject of the Kingdom of Great Britain, residing at Worcester, in the county of Worcester and Commonwealth of Massachusetts, have invented a new and useful Improvement in a Conveying Mechanism, of which the following, together with the accompanying drawings, is a specification.

The present invention relates to a conveying mechanism, as employed for metal rods or bars, and the like, and it is herein described as used in connection with a rolling mill, to receive and advance the material leaving the mill and to transfer the same to suitable receiving mechanism, such as a cooling bed.

The present invention contemplates certain improvements in the mechanism which is described in United States Letters Patent to V. E. Edwards, No. 701,024, issued May 27, 1902, wherein there is shown a conveyer for metal rods or bars which comprises a run-out or trough provided with a series of conveyer rolls having their peripheries projecting through the floor of the run-out, whereby the longitudinal advancement of the material thereon is obtained. According to said Letters Patent each conveyer roll and its bearings is pivotally supported about a substantially vertical axis, whereby the axis of rotation of a roll may be shifted with respect to a line normal to the line of longitudinal movement of the material thereon. When the conveyer rolls are shifted about their pivotal axes, a sidewise movement simultaneous with the longitudinal movement is imparted to the material, to assist in the broadside transfer of the same to suitable receiving mechanism, such as a cooling bed.

As disclosed in said Letters Patent, it has heretofore been customary to drive the series of swinging conveyer rolls of the above described mechanism by means of a cable or the like in operative engagement with all of the conveyer rolls. The disadvantages of the above described form of drive are obvious, particularly in view of the constantly changing angular disposition of the rolls, with respect to the direction of travel of the cable.

The object of the present invention is to provide an efficient and practical driving means for such a series of swinging conveyer rolls, to insure the operation of all the conveyer rolls at the same speed; and further means for simultaneously and uniformly varying the rotative speeds of all the conveyer rolls, under the instant control of an operator.

According to my invention I provide an individual driving motor for each conveyer roll and a particularly advantageous arrangement of parts whereby a conveyer roll together with its associated motor may be removed from the conveying mechanism as a separate and independent unit, for purposes of replacement or repair, as hereinafter more particularly described.

In the accompanying drawings, Figure 1 is a plan view of a portion of a conveying mechanism embodying my invention, certain parts being removed therefrom in order to show my invention more clearly.

Fig. 2 is a view partially in side elevation of the parts shown in Fig. 1.

Fig. 3 is a detail view, illustrating a portion of the mechanism.

Similar reference characters refer to similar parts in the different figures.

Referring, by way of example, to the drawings, an elevated trough or run-out 1, Fig. 1, comprises a number of longitudinal sections which are spaced apart to provide openings 2 within which are located conveyer rolls 3, herein shown as substantially conical in form. The conveyer rolls 3 are provided at their smaller ends with reduced portions 4, thus forming shoulders 5, the purpose of which will be hereinafter described. Each of the conveyer rolls 3 is carried at one end of a shaft 6 which is rotatably mounted in a suitable bearing member 7, Fig. 2. The other end of the shaft 6 projects beyond the bearing member 7 and the shaft is adapted to be retained against undue longitudinal movement within the bearing member by thrust collars 8 and nuts 9 coacting with suitable projecting portions of the shaft, or in any other well known manner.

The rotor element 10 of an electric motor is mounted on the projecting portion of the shaft 6, and is secured thereon by means of a nut 11. The stator element 12 of said electric motor is located within a cylindrical casing 13 that is supported by an annular flange 14, which is provided at one end of the bearing member 7, and serves to maintain the stator and rotor elements of the motor in coaxial relation. The bearing member 7 is further provided with a downwardly projecting portion 15, having a suitable opening for the reception and attachment of a vertically disposed pivot pin 16. The pivot pin 16 is journaled within a bearing bracket 17 that is carried by a portion of a frame 18 which supports the trough or run-out 1. The pivot pins 16 for each conveyer roll 3 of the series extend through the brackets 17 and lever arms 19 are secured to the lower projecting portions thereof. All the lever arms 19 may be connected, for operation, to a single device for moving the same in unison, as in the aforesaid patent to Edwards, or as herein shown, each arm may work between stops 20, 21, Fig. 3, being normally held against the stop 20 by a spring 22, and drawn, at the will of the operator, against the other stop 21 by the energizing of a solenoid 23. All the solenoids 23 may be operated in unison from a common switch, not shown.

A platform or floor 24, at one side of the run-out 1, is provided along one edge with a plurality of openings 25, corresponding in number and location to the openings 2, and of somewhat greater width than the latter. Suitable supporting members 26 for a sectional guard 27 are mounted along the edge of the platform 24 and extend between the openings 25. The guard 27 constitutes the side wall of the trough or run-out 1, whereby the sidewise movement in one direction of the heated product is limited. Each section of the guard 27 projects at its ends partially across the outer portions of a pair of adjacent openings 25, so that the detachment of said guard sections from the members 26, together with the removal of detachable closure plates 28 from the floor 24, completely uncovers the openings 25 and 2. With the above described construction it is possible to assemble each conveyer roll 3 and its respective supporting and driving devices, completely and separately before the several members constituting such assembly are lowered into place below platform 24 and run-out 1. Each conveyer roll, together with its driving motor and associated pivotal supporting devices thus forms a complete unit which may be removed bodily from the machine, without tearing down the latter, for purposes of replacement or repair.

In the aforesaid Letters Patent to Edwards, the series of swinging conveyer rolls are shown as operating in connection with a combined cooling bed and broadside transfer mechanism of well known construction, and for the purpose of illustrating the present invention, I have shown a similar arrangement of parts for coöperation with the conveying mechanism which is herein shown and described. It is to be understood, however, that this arrangement of parts which will now be described, constitutes, of itself, no part of my invention, and that any suitable mechanism, or devices, for receiving the rods or bars delivered by my swinging conveyer rolls, may be employed in its stead.

As described in the patent to Edwards, such a receiving mechanism may consist of a plurality of inclined skids 29, rotatably mounted in suitable bearings 30, which are afforded by one side of the frame 18. The skids 29 are provided at their upper ends with oblique wings 31, which are adapted to move in slots 32 in the floor of the trough 1, when the skids 29 are rocked. The skids 29 are provided intermediate their ends, with downwardly projecting lugs 33, to each of which are pivotally connnected a pair of reciprocating bars 34, 34, attached at their ends to the piston rod 35 of a steam or hydraulic cylinder 36, or other suitable operating device. Each skid 29 is provided with a series of projecting arms 37 which are alternately arranged to extend in opposite directions. A platform 38 is provided at the lower ends of the skids 29, and a reciprocating pusher 39 that is connected to the piston rod 40 of a steam or hydraulic cylinder 41, or other suitable operating device, is adapted to sweep across the platform 38. A plurality of conveyer rollers 42 are located at the edge of the platform 38, with their peripheries slightly below the surface of the platform 38.

For driving the swinging conveyer rolls 3, the stator elements 12 of the several electric motors, are connected by flexible conductors 43 to electrical supply mains 44, which are connected to the collector rings of a generator 45, Fig. 1. The generator 45 is coupled to a suitable driving means, such as an electric motor 46, the speed of which may be readily varied. The generator 45 is here shown as being of the alternating current type, so that the speed of the electric motors connected thereto may simultaneously be controlled by varying the speed of the motor 46. It will be readily understood, however, that any suitable individual driving means for the conveyer rolls 3 may be employed, such as direct current motors having a "shunt" characteristic, when used in connection with a variable voltage direct current generator, without departing from the spirit and scope of my invention.

The operation of the improved conveying mechanism is as follows:—The conveyer rolls 3 are normally held by springs 22 with their respective axes of rotation coincident with a line $a$—$a$, the latter being slightly inclined to a line $b$—$b$, which is at right angles to the direction of run-out 1. A bar entering the run-out 1 is thus moved along in a substantially longitudinal direction by the rotation of the conveyer rolls 3, and maintained in engagement with the guard 27, due to the axial inclination *a—a* of said rolls. When the bar has advanced so as to lie entirely upon the run-out 1, the conveyer rolls are shifted about their pivotal axes by the simultaneous energization of the solenoids 23. The respective longitudinal axes of the rolls are then in the position indicated by the line *c—c*, that is to say, oppositely inclined from the line *a—a*, which causes the bar to be moved sidewise across the rolls 3 away from guard 27, and to be carried over the shoulders 5 on to the reduced portions 4 of said rolls. While the bar is traveling upon the reduced portions 4 its longitudinal movement is considerably retarded, owing to the decreased diameter of the rolls, thereby facilitating the broadside removal of the bar from the conveyer rolls.

To accomplish said broadside removal, the skids 29 are rocked, as described in the aforesaid Edwards patent, to cause the oblique wings 31 to move up through the slots 32 and engage the bar. As the bar is lifted off the conveyer rolls it slides down the inclined edges of the wings 31 until it is stopped by the upper horizontal row of arms 37. The reverse rocking movement of the skids 29 disengages the upper row of arms 37 from the bar and allows it to move down the skids 29 against the next row of arms 37, that are oppositely disposed with respect to the preceding arms 37 which the bar has just left. The bar thus slides down the skids with a step-by-step movement until it reaches the platform 38 from which it is transferred to the rolls 42 by the reciprocating pusher 39.

From the foregoing, it is apparent that the swinging conveyer rolls 3 are all driven at substantially the same speed because the individual electric motors used for driving them all operate in synchronism with the alternating current source. Consequently the bars move through the run-out with a uniform motion, and are delivered to the skids at the proper intervals. The shifting or swinging of the conveyer rolls 3 about their pivotal axes does not interfere in the least with their uniform rotation, because the rotor element of each motor is mounted directly on the shaft of the corresponding conveyer roll, while the stator element of each motor is adapted to move with the pivotally mounted bearing member, that carries the shaft of the roll.

I claim,

1. In an apparatus of the class described, the combination with a series of bearing members each rotatable about a vertical axis, of a shaft journaled in each of said bearing members at an angle to the axis of the bearing member, a conveyer roll attached to one end of said shaft, and a motor operatively connected to the opposite end of said shaft and supported by said bearing member.

2. In an apparatus of the class described, the combination with a series of bearing members each rotatable about a vertical axis, of a shaft journaled in each of said bearing members at an angle to said vertical axis, a conveyer roll attached to one end of said shaft, a hollow cylindrical projection carried by said bearing member with its axis in alinement with the axis of said shaft, a motor inclosed in said hollow projection and attached to one end of said shaft.

3. In an apparatus of the class described, a series of bearing members each rotatable about a vertical axis, a shaft journaled in said bearing member at an angle to said vertical axis, a hollow cylindrical casing attached to said bearing member, a motor inclosed in said casing and attached to said shaft, and a conveyer roll carried by said shaft.

4. In an apparatus of the class described, a series of bearing members rotatable about a vertical axis, shafts carried by said bearing members, a conveyer roll attached to one end of each shaft, an electric motor supported by said bearing member and attached to the opposite ends of said shafts, and means for connecting each of said motors to a common source of electric energy.

5. In a conveying mechanism, a conveyer roll unit comprising a roll, means for rotatably and pivotally supporting said roll about axes at an angle to each other, and an individual driving motor for said roll.

6. In a conveying mechanism, a conveyer roll unit comprising a bracket, a bearing member pivotally mounted on said bracket about a vertical axis, a shaft extending through said bearing member at an angle to said pivotal axis, a roll carried at one end of said shaft, and a driving motor carried at the other end of said shaft.

7. In a conveying mechanism, a conveyer roll unit comprising a bracket, a bearing member pivotally mounted on said bracket about a vertical axis, a shaft extending through said bearing member at an angle to said pivotal axis, a roll carried at one end of said shaft, and an electric motor for driving said roll having its rotor carried at the other end of said shaft and having its stator inclosed in a casing carried by said bearing member.

8. In an apparatus of the class described, the combination of a series of rotatable and pivotally supported conveyer rolls, a roll support, an electric motor for driving each of said conveyer rolls, each of said motors having its rotor and stator elements mounted coaxially with respect to the axis of rotation of its connected conveyer roll and having both of said elements held by the roll support and adapted to swing about the pivotal axis of the roll support and in unison therewith.

9. In an apparatus of the class described, the combination of a bearing member pivotally supported, a shaft journaled in said bearing member, a conveyer roll carried by one end of said shaft, and an electric motor for rotating said shaft having its rotor element attached to the shaft and its stator element carried by said pivoted bearing member.

10. In a conveying mechanism, the combination with a platform provided with a plurality of openings along one edge thereof and a trough extending along the platform and provided with openings corresponding with the openings in said platform, of a plurality of conveyer rolls projecting above the top of said trough, each roll being independently removable through said openings.

11. In a conveying mechanism, the combination with a platform provided with a plurality of openings along one edge thereof and a trough extending along the platform and provided with openings corresponding with the openings in said platform, of a plurality of pivotally and rotatably mounted conveyer rolls projecting above the top of said trough and respectively provided with an individual driving motor located below said platform, each roll together with its means of support and associated driving motor being independently removable through said openings.

12. In a conveying mechanism, the combination with a platform provided with a plurality of openings along one edge thereof and a trough extending along the platform and provided with openings corresponding with the openings in said platform, of a plurality of conveyer rolls projecting through the openings in said trough, means for pivotally and rotatably supporting each of said rolls, and individual driving motors for each of said rolls located below said platform, each roll together with its supporting means and associated driving motor being independently removable, as a unit, through said openings.

13. In a conveying mechanism, the combination with a platform provided with a plurality of openings along one edge thereof and a trough extending along the platform and provided with openings corresponding with the openings in said platform, of a plurality of conveyer roll units, each independently removable through said openings and respectively comprising a conveyer roll projecting through an opening in said trough, means for rotatably and pivotally supporting said roll about axes at an angle to each other, and an individual driving motor for said roll.

14. In a conveying mechanism, the combination with a platform provided with a plurality of openings along one edge thereof and a trough extending along the platform and provided with openings corresponding with the openings in said platform, of a plurality of conveyer roll units, each independently removable through said openings and respectively comprising a bracket supported below said trough, a bearing member pivotally supported by said bracket about a vertical axis, a shaft extending through said bearing member at an angle to said vertical axis, a conveyer roll carried at the upper end of said shaft and projecting through an opening in said trough, and a driving motor for said roll carried at the opposite end of said shaft.

15. In a conveying mechanism, the combination with a series of rotatably and pivotally mounted conveyer rolls for imparting a combined longitudinal and sidewise movement to a bar, across the rolls, of individual driving means for each of said rolls adapted to move in unison therewith when said rolls are turned on their pivotal axes.

16. In a conveying mechanism, the combination with a series of rotatably and pivotally mounted conveyer rolls for imparting a combined longitudinal and sidewise movement to a bar, across the rolls, of individual driving motors connected to each of said rolls for rotating the same, each of said motors being adapted to swing about the pivotal axis of its associated roll.

17. In a conveying mechanism, the combination with a series of rotatably and pivotally mounted conveyer rolls for imparting a combined longitudinal and sidewise movement to a bar, across the rolls, of individual driving motors connected to each of said rolls for rotating the same, each of said motors being adapted to swing about the pivotal axis of its associated roll, and means for operating all of said motors in synchronism.

18. In a conveying mechanism, the combination with a series of rotatably and pivotally mounted conveyer rolls for imparting a combined longitudinal and sidewise movement to a bar, across the rolls, of individual driving motors connected to each of said rolls for rotating the same, each of said motors being adapted to swing about the pivotal axis of its associated roll, and all of said motors being connected to a common source of electrical energy.

Dated this 13th day of August 1917.

JOHN W. SHEPERDSON.

Witnesses:
  WILLARD A. WINN,
  THEODORE H. NYE.